United States Patent [19]

Branchcomb

[11] Patent Number: 5,104,534
[45] Date of Patent: Apr. 14, 1992

[54] FILTER DESIGN

[76] Inventor: Gerald Branchcomb, 9845-B Frankoma Rd., Sapulpa, Okla. 74066

[21] Appl. No.: 718,295

[22] Filed: Jun. 20, 1991

[51] Int. Cl.$^5$ .............................................. B01D 27/06
[52] U.S. Cl. ................................. 210/315; 210/493.5; 210/497.1; 210/497.01
[58] Field of Search ............ 210/315, 458, 487, 493.1, 210/493.4, 493.5, 497.1, 497.01; 55/497, 498, 500, 521, 510

[56] References Cited

U.S. PATENT DOCUMENTS 2,627,350 2/1953 Wicks ................................... 210/458
4,909,937 3/1990 Hoffman et al. ...................... 210/458

Primary Examiner—Robert A. Dawson
Assistant Examiner—Wanda L. Millard
Attorney, Agent, or Firm—William S. Dorman; Molly D. McKay

[57] ABSTRACT

The invention is a filter including a housing within which are positioned annular, concentrically mounted filter elements that are folded in opposite helical pleats so that the inside pleats of the outer filter element touch the outer pleats of the inner filter element in a crisscross fashion. Being positioned in this manner, the filter elements support each other and form channels between them through which filtered material passes before exiting the filter. The invention also including a housing within which is positioned pairs of annular filter elements consecutively numbered with capped ends for selective fluid passage between the inner surface of the odd elements and the outer surface of the even elements.

6 Claims, 3 Drawing Sheets

FILTER DESIGN

BACKGROUND OF THE INVENTION

1. Field of the Invention

The present invention relates to a new and improved filter design. More particularly, the present invention relates to a filter comprised of at least two concentric annular filter elements which are folded in helical pleats of opposite directions so that the inside pleats of the outer filter element touch the outer pleats of the inner filter element, supporting each other and forming channels between them through which filtered material may pass as it exits the filter.

2. The Prior Art

Preliminary searches were conducted on the invention disclosed herein, and the following listed patents were uncovered in the searches:

| Patent No. | Inventor | Issue Date |
|---|---|---|
| 628,534 | Haefner | July 11, 1899 |
| 2,387,368 | Vokes | October 23, 1945 |
| 3,204,771 | Baldwin | September 7, 1965 |
| 3,211,292 | Bull | October 12, 1965 |
| 3,361,260 | Buckman | January 2, 1968 |
| 3,370,708 | Hultgren | February 27, 1968 |
| 3,420,377 | Vandersip | January 7, 1969 |
| 3,467,256 | Humbert | September 16, 1969 |
| 3,988,244 | Brooks | October 26, 1976 |
| 4,036,758 | Combest | July 19, 1977 |
| 4,317,727 | Meissner | March 2, 1982 |
| 4,507,200 | Meissner | March 26, 1985 |
| 4,537,681 | Argiropoulos | August 27, 1985 |

One type of filter in common use employs a filter cartridge comprised of inner and outer concentric annular filter elements separated by an annular region. The filter elements used are normally made of filter paper which has been folded in an axial orientation. The filter cartridge is mounted in a housing having an inlet communicating with the outer surface of the outer filter element and the inner surface of the inner filter element and an outlet communicating with the annular region between the two filter elements.

Material to be filtered flows into the filter through the inlet and then flow radially inward through the outer filter element and radially outward through the inner filter element to the annular region between the filter elements and then flows axially through the annular region to the outlet.

A problem of the described filer cartridge is the tendency of its filter elements to collapse toward the annular region due to the opposing forces exerted thereon by the differential pressures between the inside and outside surfaces of the filter elements. The axially folded pleats of the collapsing filter element tend to enmesh with the axially folded pleats of the other filter element, restricting flow to the outlet and reducing the useful life of the filter elements.

Various devices and materials have been employed for supporting the filter elements and providing a channel between the filter elements, but addition of these devices or materials adds to the total cost of producing a filter.

An example of a typical prior art solution to this problem is disclosed in U.S. Pat. No. 3,988,244 which teaches a way to prevent collapse of the filter elements by positioning a "fluid carrier element" between the filter elements. By positioning the "fluid carrier element" between the inner surface of the outside filter element and the outer surface of the inside filter element, the device acts to cancel the forces exerted on the filter elements by the pressure differential. However, addition of the "fluid carrier element" increases the total cost of the filter.

U.S. Pat. No. 3,361,260 teaches a method of impressing spacer dimples into axially folded filter elements to hold them in place without the addition of other devices or materials. However, spacer dimples do not provide sufficient support to the filter elements.

The remaining patents listed above are not considered sufficiently pertinent as to require any comment.

The present invention is superior to the prior art in that it allows a shorter pleat height in the filter elements with increased surface area and increased collapse resistance. The invention's helically pleated filter elements are superior to those of the prior art in that they have uniform spacing between the pleats and are self-supporting which avoids the extra cost of filter supports in the manufacture of the filter cartridge.

SUMMARY OF THE INVENTION

It is an object of the present invention to provide a new and improved filtering device that includes a housing having an inlet and outlet and helically pleated filter elements mounted concentrically within the housing.

Briefly, the present invention is directed to a new and improved device commonly referred to as a cartridge filter for filtering either liquids or gases. The cartridge filter includes a housing having an inlet and outlet and at least a pair of oppositely spiralled, helically pleated filter elements mounted concentrically within the housing. The inlet is sealed from communicating with the outlet by a flexible flange or a conventional seal. The surfaces of a filter element touch the surfaces of its paired filter element providing support for the elements and functioning to cancel out the equal and opposite forces experienced by the filter elements as a result of the pressure drop across them. The pleats of the filter element pair cross each other forming spaces between them through which filtered material may pass via a perforated tube or ring to the outlet.

DETAILED DESCRIPTION OF THE PREFERRED EMBODIMENTS

Figure 1:
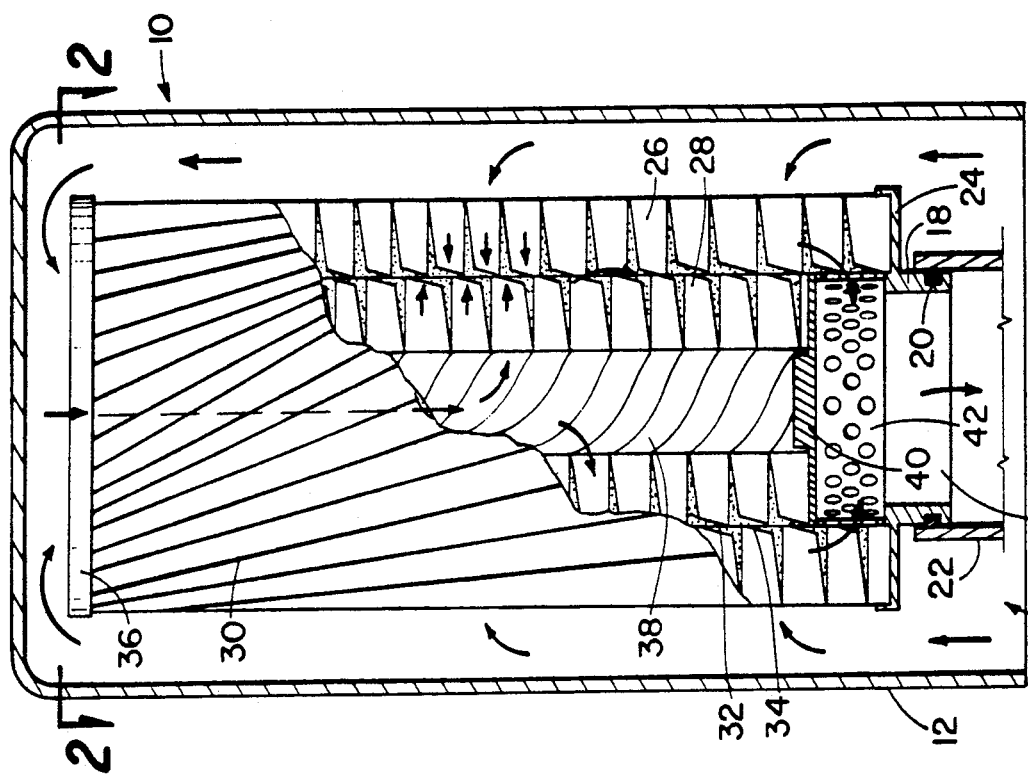
FIG. 1 is a cross-sectional view of a preferred embodiment of a cartridge filter constructed in accordance with the principles of the present invention.
Figure 2:
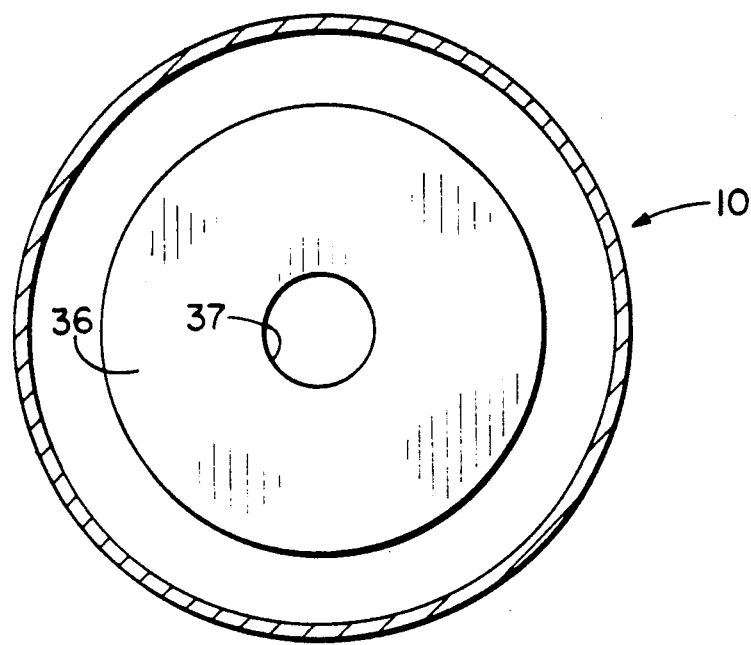
FIG. 2 is a cross-sectional view of the filter assembly of the cartridge filter taken along line 2—2 of FIG. 1.

Referring to the drawings and initially to FIGS. 1 and 2, there is illustrated a dual element cartridge filter generally designated by the reference numeral 10. Cartridge filter 10 may be incorporated into a canister, pipe, tank, or other enclosure for filtering liquids or gases.

In FIG. 1, the cartridge filter 10 is composed of two concentrically arranged filter elements, an interior filter element 28 and an adjacent external filter element 26. Within filter element 28 lies an annular area 38. The two filter elements 26 and 28 each have two ends, one end which connects to a filtering system and one end opposite to the connecting end.

The cartridge filter is enclosed in an impervious housing designated by the reference numeral 12. The housing 12 has an inside surface and an outside surface. The cartridge filter 10 is connected on one end to a filtering system by an inlet port 14 and outlet port 16. Inlet port 14 is formed by the inside surface of the housing 12 and the flange 22 extending from the filtering system to Which the filter is connected. The inlet port 14 is in communication with the interior surface of the housing 12.

The filter base 18 has an outside surface and an inside opening which forms outlet port 16. The inlet port 14 is separated from the outlet port 16 by means of a seal 20 located on the outside surface of filter base 18 and which seats against flange 22. The filter base 18 extends radially to form an end cap 24 for the exterior filter element 26 on the end of filter element 26 which connects to the filtering system.

The ends of the two filter elements 26 and 28 which are located opposite the connecting ends lie in substantially the same horizontal plane. Both the exterior filter element 26 and the interior filter element 28 are folded in helical pleats 30 along the longitudinal axis of the filter, one being left handed helical and the other being right handed helical so the pleats of one spiral in the opposite direction of the pleats of the other. The pleats of each filter element have exterior surfaces and interior surfaces. The interior filter element 28 is sized so its exterior pleat surfaces 32 fit against the interior pleat surfaces 34 of the exterior filter element 26.

Filter element 26 and filter element 28 are sealed on their ends opposite the outlet by a flattened doughnut shaped end cap 36. The hole 37 within the end cap 36 allows material to be filtered to flow into the annular area 38 of filter element 28. Filter element 28 is somewhat shorter in length than filter element 26, element 28 being shortened at its outlet end. End cap 40 completely seals the outlet end of filter element 28 and the outlet end of annular space 38.

Adjacent to end cap 40 and located between it and the filter base 20, is a short perforated tube 42 which communicates with the outlet 16. When the filter is constructed, the filter base 18, the perforated tube 42, and the end cap 40 could be formed as a single unit, lowering the total cost of producing the filter.

Figure 5:
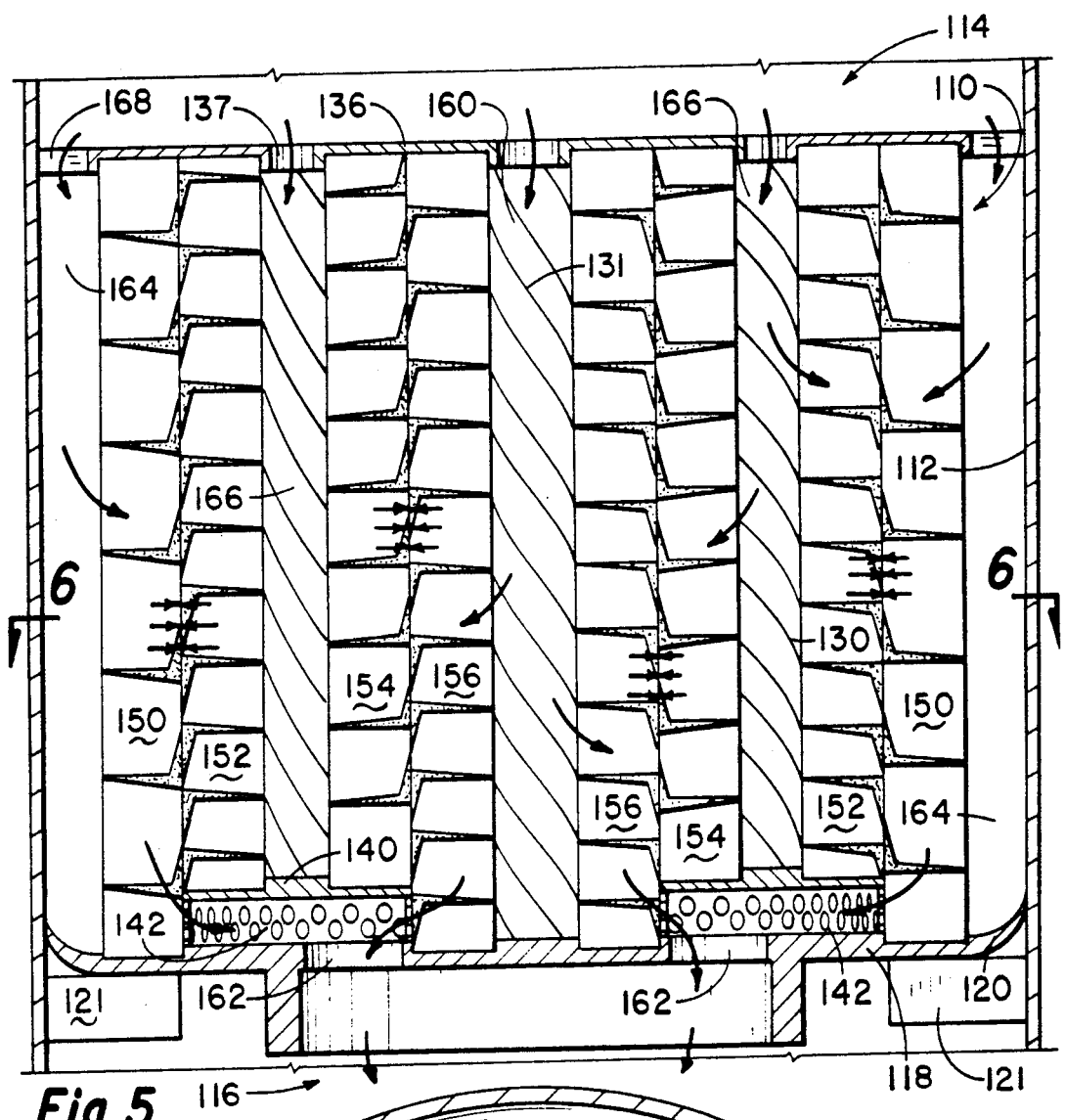
FIG. 5 is a cross-sectional view of a cartridge filter comprising an alternative embodiment of the invention.
Figure 6:
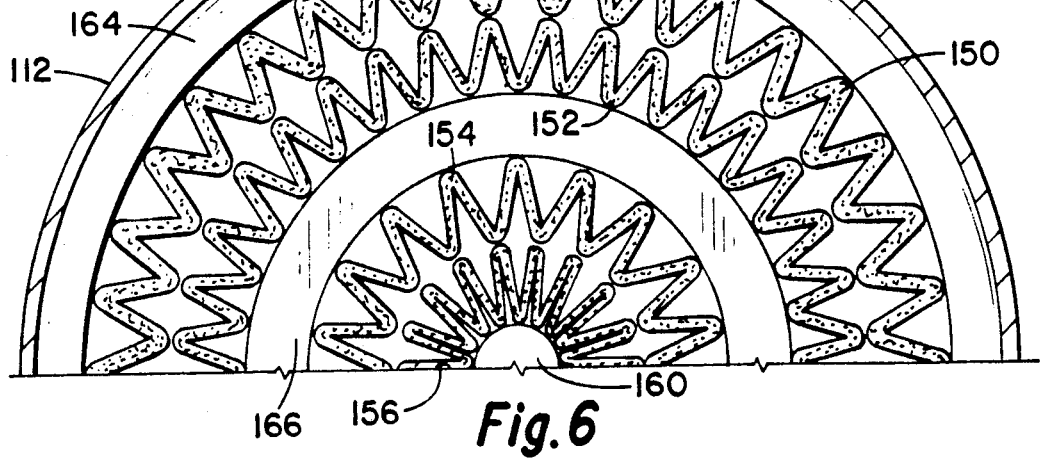
FIG. 6 is a cross-sectional view of the filter assembly of the cartridge filter taken along line 6—6 of FIG. 5.

An alternative arrangement of the invention which increases filter surface area with only a small increase in filter diameter is shown in FIGS. 5 and 6. FIG. 5 illustrates a four element cartridge filter generally designated as reference numeral 110. Additional pairs of oppositely spiralled helical filter elements could be added. The cartridge filter 110 is located within the interior of a cylindrical pipe 112 which connects the cartridge filter to a filtering system. The pipe 112 has an interior surface and an exterior surface. The cartridge filter is located within the pipe 112 between an inlet 114 and an outlet 116, the cartridge filter having an inlet end and an outlet end.

The seal 120 depicted in FIG. 5 is modified for use in a straight tube or pipe. The inlet 114 is sealed from the outlet 116 via a flexible peripheral flange 120 protruding from the lateral surface of the filter base 118, said flange 120 seats against the interior surface of the pipe 112 when material to be filtered is flowing through pipe 112. The filter base 118 is supported by lugs 121 affixed to the pipe 112. The four filter elements 150, 152, 154 and 156 are arranged in a concentric relation within the filter, filter element 150 being the outermost, filter element 156 being the innermost, filter element 152 is against element 150, and element 154 is between element 152 and 156. Each filter element has two ends, an inlet end adjacent the inlet 114 and an outlet end adjacent the outlet 116.

The inlet 114 is in communication with three spaces: the first space 164 being an annular space located between the interior surface of the pipe 112 and the exterior surface of filter element 150, the second space 166 being an annular space located between the interior surface of filter element 152 and the exterior surface of filter element 154, and the third space 160 being a central cylindrical space located within the interior of the innermost filter element 156.

The four filter elements (150, 152, 154, and 156) are concentrically mounted inside pipe 112, the inlet ends of all filter elements being flush with each other and sealed by end cap 136. End cap 136 contains holes 137 through which material to be filtered flows from the inlet 114 into the interior spaces 160 and 166.

Filter element 150 and the adjacent filter element 152 are folded in helical pleats 130 along the longitudinal axis of the filter, one being left handed helical and the other being right handed helical so the pleats of one spiral in the opposite direction of the pleats of the other. The filter elements 150 and 152 are sized so the inner pleats of filter element 150 fit against the exterior pleats of filter element 152 thereby providing support to each filter element and canceling out the opposing differential pressures exerted on them.

Filter element 154 is sized so it fits within the interior of filter element 152 and is separated from it by a space 166. Both filter element 154 and filter element 156 are folded in helical pleats 131 along the longitudinal axis of the filter, one being left handed helical and the other being right handed helical so the pleats of one spiral in the opposite direction of the pleats of the other. Filter element 156 is sized so it has a central space 160 within it and so the inner pleats of filter element 154 fit against the exterior pleats of filter element 156 thereby providing support to each filter element and canceling out the opposing differential pressures exerted on the filter elements 154 and 156.

Filter element 150 and filter element 156 are sealed at the outlet end by filter base 118. The filter base 118 also serves as an end cap for the outlet end of the central space 160. The filter base 118 has openings 162 which communicate with the outlet 116.

The inlet end of cartridge filter 110 is held in place Within the pipe 112 by several ears 168 extending from the lateral edge of the inlet end cap 136. The ears 168 are spaced around the end cap 136 in such a way to allow material to be filtered to flow between them and enter space 164.

Filter element 152 and filter element 154 are the same length as each other, and filter element 150 and filter element 156 are the same length as each other. Filter elements 152 and 154 are somewhat shorter in length than filter elements 150 and 156. The two shorter filter elements 152 and 154 are shortened at the outlet end of the filter, and their outlet ends are completely sealed by end cap 140.

End cap 140 also seals annular space 166 at the outlet end. Adjacent to end cap 140 and located between it and the filter base 118 is a short perforated annular ring 142 which communicates with the outlet 116 via the holes 162 in the filter base 118.

When the filter is constructed, the filter base 118, the perforated annular ring 142, the end cap 140, and the lateral extension 120 could be formed as a single unit, lowering the total cost of producing the filter.

Figure 3:
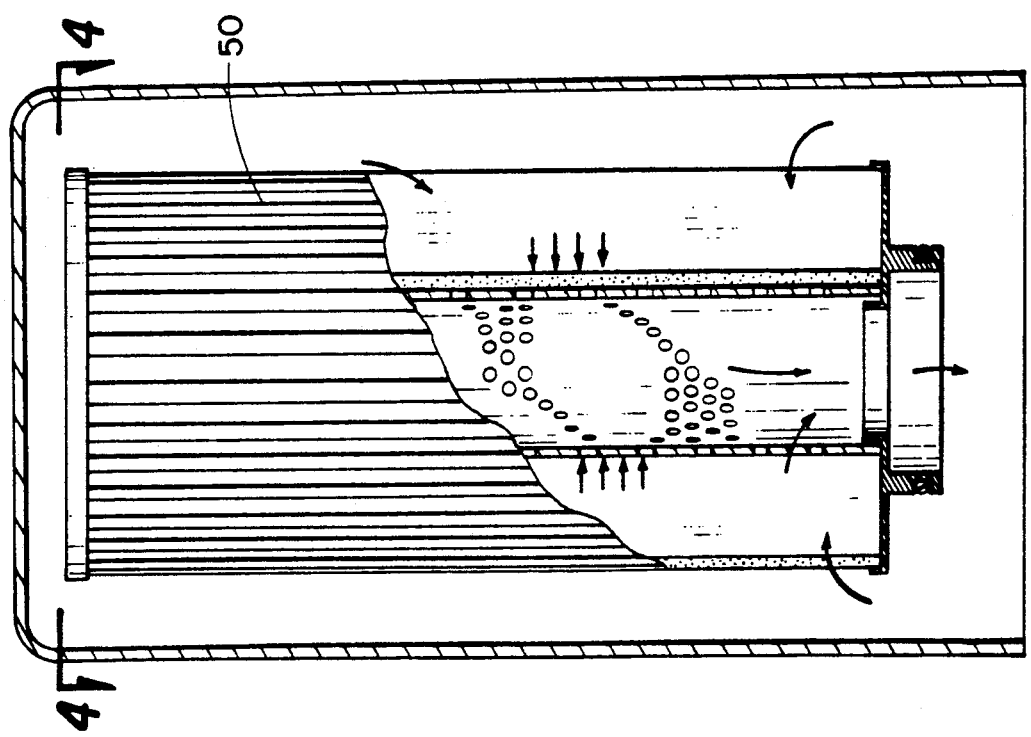
FIG. 3 is a cross-sectional view of a cartridge filter constructed in accordance with typical prior art.
Figure 4:
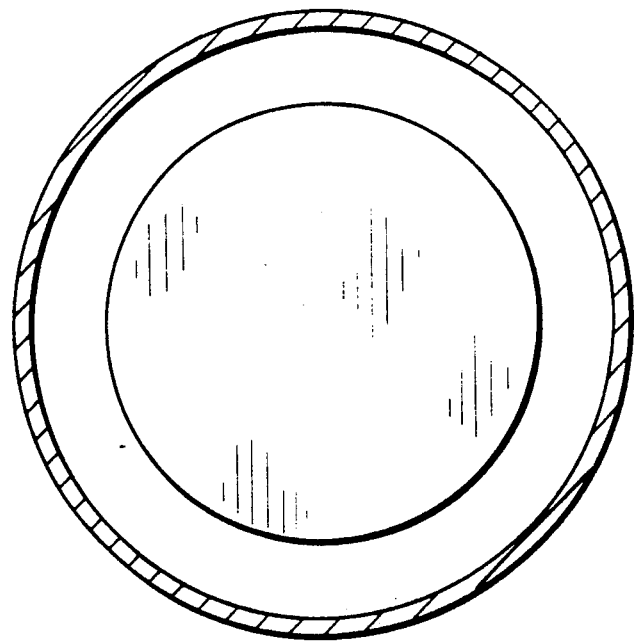
FIG. 4 is a cross-sectional view of the filter assembly of the cartridge filter taken along line 4—4 of FIG. 3.

FIGS. 3 and 4 show a typical single element filter cartridge with longitudinal straight pleats 50 as described in the prior art.

Whereas the present invention has been described in particular relation to the drawings attached hereto, it should be understood that other and further modifications, apart from those shown or suggested herein, may be made within the spirit and scope of this invention.

What is claimed is:

1. A filter assembly comprising a housing having an inlet and an outlet and a seal preventing communication between the inlet and outlet; a filter cartridge including an inner annular filter element and an outer annular filter element disposed in the housing, the inner annular element having an inner surface and an outer surface, the outer annular element having an inner surface and an outer surface, the inner surface of the inner element and the outer surface of the outer element being in communication with the inlet, the outer element having an upper end and a lower end, the filter cartridge having a longitudinal axis running from the upper end of the filter elements to the lower end of the filter elements, the inner element having an upper end and a lower end, the upper end of the inner element lying in substantially the same horizontal plane as the upper end of the outer element, the upper ends of both inner and outer elements sealed at their upper ends by means of an upper end cap, the upper end cap sealing the inner surface of the outer annular element and the outer surface of the inner annular element from communicating with the inlet, the upper end cap having openings allowing material to be filtered to flow from the inlet inward to the inner surface of the inner element, the lower end of the outer annular element being sealed by a lower end cap, the lower end of the inner annular element being sealed, the inner surface of the outer annular element and the outer surface of the inner annular element being in communication with the outlet; and the improvement characterized by the annular elements being folded in opposite helical pleats along the longitudinal axis of the filter, the outer surface of the inner element resting against the inner surface of the outer element so that the pleats of one element are crossed with respect to the pleats of the adjacent element; whereby material to be filtered will pass into the inlet, from the inlet through the outer surface of the outer annular element and toward the bottom thereof, and also from the inlet through the inner surface of the inner annular element and toward the bottom thereof and from the bottom of the inner surface of the outer annular element and the bottom of the outer surface of the inner annular element to the outlet.

2. A filter according to claim 1 wherein the lower end cap is provided with a flexible peripheral flange, the flexible peripheral flange forming a flexible lip around the lower end of the cartridge, the flexible peripheral flange seating against the filter housing forming a seal between the inlet and the outlet of the filter.

3. A filter according to claim 1 wherein the lower end of the inner element is disposed above the lower end of the outer element so as to form a cylindrical space adjacent the lower end of the outer element and extending downward so the lower end of the cylindrical space lies in substantially the same horizontal plane as the lower end of the outer element, a short perforated tube mounted in the cylindrical space having a flat imperforate surface resting against the lower end of the inner element and a perforated cylindrical surface in communication with the inner surface of the outer element, the perforated tube having an open end adjacent to and communicating with the outlet; whereby material to be filtered will pass into the inlet, through the outer surface of the outer annular element and toward the bottom thereof, through the inner surface of the inner annular element and toward the bottom thereof, from the bottom of the inner annular element into the bottom of the outer annular element and from the bottom of the outer annular element through the perforated cylindrical surface to the outlet.

4. A filter according to claim 3 wherein the lower end cap is provided with a flexible peripheral flange, the flexible peripheral flange forming a flexible lip around the lower end of the cartridge, the flexible peripheral flange seating against the filter housing forming a seal between the inlet and the outlet of the filter.

5. A filter assembly comprising a housing having an inlet and an outlet; a filter cartridge including at least two pairs of annular filter elements disposed in the housing, each annular element having an inner surface and an outer surface, the annular elements numbered consecutively beginning with the outermost element as number "1" and counting inwardly until all annular elements have been numbered, the annular elements arranged in pairs of two elements per pair, the inner surfaces of the even numbered elements and the outer surfaces of the odd numbered elements being in communication with the inlet, each annular element having an upper end and a lower end, the upper ends of all annular elements lying in substantially the same horizontal plane and sealed at their upper ends by means of an upper end cap, the upper end cap sealing the inner surfaces of the odd numbered annular elements and the outer surfaces of the even numbered annular elements from communicating with the inlet, the upper end cap having openings in it between each of the pairs of annular elements, the openings in the upper end cap being numbered consecutively beginning with number "1" for the opening between the outermost pair of annular elements and the adjacent pair of annular elements and counting inwardly until all openings have been counted, the lower ends of all of the annular elements being located adjacent to the outlet, the lower ends of the annular elements being of two lengths, the shorter annular elements being those which communicate with the inlet via odd numbered holes in the upper end cap, the longer annular elements being the outermost annular element and those annular elements which communicate with the inlet via even numbered holes in the upper end cap, the lower ends of each annular element being sealed by means of an end cap, the lower ends of the shorter annular elements being disposed above the lower ends of the longer annular elements so as to form annular spaces adjacent the lower ends of the longer annular elements and said annular spaces extending downward so the lower ends of the annular spaces lay in substantially the same horizontal plane as the lower ends of the longer annular elements, short perforated annular rings mounted in the annular spaces, said rings each having a top end and bottom end, the top ends of the perforated annular rings being flat imperforate surfaces resting against the lower ends of the shorter annular elements, the annular rings having perforated annular surfaces between their top ends and bottom ends, said perforated surfaces being in communication with the inner surfaces of the longer annular elements, the bottom end of the perforated annular rings being open and communicating with the outlet, the inner surfaces of the odd numbered annular elements and the outer surfaces of the even numbered annular elements being in communication with the outlet, the outer surfaces of the odd numbered annular elements and the inner surfaces of the even numbered annular elements being in communication with the inlet, the inlet being sealed from the outlet by means of a seal on the end cap sealing the lower ends of the annular elements; whereby material to be filtered will pass into the inlet, through the openings in the upper end cap and around the end cap inward to the inner surfaces of the even numbered annular elements and to the outer surfaces of the odd numbered annular elements, through the outer surfaces of the odd numbered annular elements and toward the bottom thereof, through the inner surface of the even numbered annular elements and toward the bottom thereof, from the bottom of the shorter annular elements into the bottom of the longer annular elements and from the bottom of the longer annular elements through the perforated cylindrical surfaces of the annular rings to the outlet.

6. A filter according to claim 5 wherein each pair of annular elements comprises annular elements which are folded in opposite helical pleats, the outer surfaces of the even numbered annular elements resting against the inner surfaces of the odd numbered annular elements so that the pleats of the even numbered annular elements are crossed with respect to the pleats of their paired odd numbered elements.

* * * * *